United States Patent [19]
Valvassori et al.

[11] 3,900,452
[45] Aug. 19, 1975

[54] OLEFINIC COPOLYMERS AND PROCESS FOR THE PREPARATION THEREOF

[75] Inventors: Alberto Valvassori, Milan, Italy; Guido Sartori, Brussels, Belgium; Vittorio Turba, Milan, Italy

[73] Assignee: Montecatini Edison S.p.A., Milan, Italy

[22] Filed: Jan. 17, 1969

[21] Appl. No.: 797,337

Related U.S. Application Data

[63] Continuation-in-part of Ser. Nos. 373,064, June 5, 1964, abandoned, and Ser. No. 515,482, Dec. 21, 1965.

[30] Foreign Application Priority Data

June 7, 1963 Italy.................................. 12064/63
Nov. 12, 1963 Italy.................................. 23100/63

[52] U.S. Cl.......................... 260/80.78; 260/80.3 R
[51] Int. Cl......................... C08f 15/14; C08f 15/40
[58] Field of Search................................. 260/80.78

[56] References Cited
UNITED STATES PATENTS

3,285,889   11/1966   Arnold............................. 260/80.5
3,509,239    4/1970   Tindall............................. 260/889

FOREIGN PATENTS OR APPLICATIONS

1,121,844    7/1968   United Kingdom

OTHER PUBLICATIONS

C. S. Marvel and John R. Rogers, J. Polymer Science, 1961, 49, pp. 335–352.

*Primary Examiner*—Joseph L. Schofer
*Assistant Examiner*—A. L. Clingman

[57] ABSTRACT

Substantially linear, amorphous, unsaturated, high molecular weight copolymers of at least one monoolefin selected from ethylene and higher alpha-olefins, with 1, 4, 9-decatriene, alkyl, aryl, and arylalkyl-substituted 1, 4, 9-decatrienes, or 1, 5, 9-decatriene, are disclosed. The copolymers are sulfur-vulcanizable to useful synthetic eleastomers. A process for obtaining the copolymers by copolymerizing a mixture of the selected monomers in contact with catalysts prepared from certain transition metal compounds and organometallic compounds or hydrides of Group I to III metals is also disclosed.

24 Claims, No Drawings

OLEFINIC COPOLYMERS AND PROCESS FOR THE PREPARATION THEREOF

This is a continuation-in-part of Ser. No. 373,064 (filed June 6, 1964) now abandoned and of Ser. No. 515,482 (filed Dec. 21, 1965) still pending.

THE PRIOR ART

Certain copolymers of one or more aliphatic alpha-olefins with aliphatic dienes having at least one terminal unsaturation are described in Italian Pat. Nos 565,530 and 638,953.

The aliphatic dienes having at least one terminal unsaturation tend, under given conditions, to polymerize intermolecularly and intramolecularly in the presence of catalysts acting through an anionic coordination type mechanism. When this accurs, a certain proportion of diene monomer units, which may be a more or less high proportion depending on the specific catalyst system and operating conditions used, form saturated rings which constitute inert sites in the main chain and cannot be utilized in vulcanizing copolymers of such dienes with aliphatic monoolefins by means of mixes based on sulfur and accelerants of the kind commonly used in the vulcanization of unsaturated rubbers.

THE PRESENT INVENTION

A primary object of this invention is to provide new, linear, amorphous, unsaturated, high molecular weight copolymers of one or more monoolefins selected from ethylene and higher alpha - olefins of the formula $CH_2=CHR$ in which R is an alkyl group containing from 1 to 6 carbon atoms, with certain selected aliphatic polyenes containing at least three double bonds of which at least one is of vinyl type, which copolymers are readily vulcanizable by the conventional recipes to useful elastomers because each of the monomer units derived from the aliphatic polyenes contains a residual, reactive double bond, such double bonds occur along the copolymer macromolecular main chain and provide sites of unsaturation that enter into the vulcanization reaction, and none of the units derived from the polyene constitutes an inert site which cannot be utilized in the vulcanization step.

This and other objects are accomplished by the present invention in accordance with which, in the presence of particuular catalysts, one or more of the monoolefins is (are) copolymeried with 1,4,9-decatriene, with an alkyl and/or aryl substituted 1,4,9-decatriene, or with n-decatriene-1,5,9 and it is found that, even when cyclization of the polyene occurs during the copolymerization, each of the copolymer units derived from the polyene contains at least one residual unreacted double bond so that the copolymer can be vulcanized by means of the conventional processes utilizing recipes based on sulfur and accelerants.

In contrast to the experience had with the dienes as mentioned above, none of the 1,4,9-decatriene, alkyl and/or aryl substituted decatrienes, or n-decatriene-1,5,9 is wasted since each of the copolymer units derived therefrom contains at least one residual unsaturation capable of participating in the subsequent vulcanization reaction.

The 1,4,9-decatriene used in practicing this invention can be obtained by known methods, for instance by reacting two moles of butadiene with one mole of ethylene in the presence of catalytic systems containing zero - valent Ni, as determined by G. Wilke, Angew. Chemie. 75. 10 (1963).

The monomeric n-decatriene-1,5,9 which can be used as one comonomer in preparing the new copolymers can be made available readily, since it can be prepared, for instance, by reacting magnesium allyl bromide and 1,4-dichlorobutene-2, or by co-oligomerization of ethylene with butadiene.

Alkyl - substituted decatrienes which are useful include e.g. 5,9—dimethyldecatriene 1,4,9; 9-methyldecatriene-1,4,9.

Aryl - substituted decatrienes which are useful include 1-phenyldecatriene-1,4,9; 1-tolydecatriene-1,4,9; 1-phenyl-4, 8-dimethyldecatriene-1,4,9; and 1-phenyl-3,7-dimethyldecatriene-1,4,9. Said monomers are readily available or easily prepared. For example, 1-pheneyldecatriene-1,4,9 can be prepared by reacting styrene and butadiene in the presence of catalytic systems containing zero - valent nickel.

Satisfactory copolymers are obtained by copolymerizing the decatriene or phenyldecatriene with one or more monoolefins selected from ethylene, propylene and butene-1.

By copolymerizing a mixture of ethylene, propylene and/or butene-1 with 1,4,9-decatriene, phenyldecatriene, or with n-decatriene-1,5,9, under conditions described more fully hereinbelow, we have obtained a crude (total) copolymerizate consisting of unsaturated macromolecules in each of which units derived from all of the starting monomers are randomly distributed, and in which each of the units resulting from the polymerization of the decatriene or phenyl-substituted decatriene contains at least one free unsaturation, as shown by examination of the I.R. spectrum.

Such unsaturations constitute reactive sites enabling the copolymerizates to undergo subsequent reactions. As noted, the unsaturations permit the copolymerizates to be vulcanized with sulfur-containing mixes of the same type as used conventionally with unsaturated rubbers. Also, the double bonds present in the macromolecules can, e.g., after oxidation with ozone, give rise to polar groups, such as carbonylic groups, which in turn can constitute reactive groups for subsequent reactions, such as vulcanization of the copolymerizate by means of polyvalent basic substances, and can be ֹed to improve the adhesive properties of the copoly֭ ֭ri-zates.

The double bonds can also be used in additior reactions with metal hydrides such as LiH, ֹaBH$_4$, AlH(C$_4$H$_9$)$_{,2}$ etc. whereby metal-to-carbon bonds are formed which can, in turn, partake in other subsequent reactions for modifying the properties of the copolymerizates in various respects.

The copolymerizates of this invention possess a substantially linear structure, as evidenced by the properties exhibited thereby, in particular the viscous behavior, which is practically identical with the viscous behavior of the known linear, amorphous and vulcanizable copolymerizates of ethylene and propylene, such as the known Natta et al linear amorphous copolymers of ethylene and higher alpha-olefin. In fact, the other terpolymers of ethylene, a higher alpha-olefin, and a polyene which have been patented recently, these terpolymers may be regarded as linear, amorphous copolymers of ethylene and a higher alpha-olefin, such as propylene, which retain essentially the properties of the amorphous, linear ethylene/propylene copolymers of Natta et al. but are modified for improved sulfur-vulcanizability.

The molecular weight of the present copolymerizates, determined viscosimetrically, is higher than 20,000; the intrinsic viscosity is higher than 0.5, measured in tetralin at 135°C or in toluene at 30°C. The intrinsic viscosity may be from 0.5 to 10 or higher.

These copolymers in which units of all of the starting monomers are randomly distributed, can be defined as having a completely homogeneous composition.

Evidence of the homogeniety is provided by the fact that products which are well vulcanized can be obtained by vulcanizing the copolymers according to the techniques normally used for vulcanizing unsaturated rubbers.

The double bonds present in the copolymers show such a high reactivity in the vulcanization process using mixes based on sulfur and accelerants that they can be vulcanized not only by means of the mixes used conventionally for the vulcanization of rubbers having low unsaturation, such as butyl rubber, but, surprisingly, can be vulcanized, also, by means of the mixes used conventionally for vulcanizing rubbers having high unsaturation, such as natural rubber or GR-S. The surprising capacity of the present copolymers to be vulcanized by means of the mixes used conventionally for vulcanizing the highly unsaturated rubbers makes it possible to co-vulcanize mixtures of the present copolymers with the highly unsaturated rubbers, natural or synthetic, and thus obtain vulcanizates having considerably improved resistance to acids or oxidants.

Further evdience of the good, random distribution of the unsaturations along the macromolecular chains is provided by the fact the vulcanized copolymerizates are completely insoluble in organic solvents, such as aliphatic hydrocarbons, and are swollen to only a limited extent by a few aromatic solvents, in contrast to the copolymerizates as such, which are completely soluble in boilinig n-heptane.

The vulcanized rubbers obtained from the present copolymers are characterized by excellent mechanical resistance and low sets at break. In particular, the vulcanizates exhibit high reversible elastic elongations and also exhibit high tensile strengths, especially when reinforcing fillers such as carbon black are used in the vulcanizing mix.

The copolymers as such, prior to vulcanization, possess the typical properties of unvulcanized elastomers, in that they show low initial elastic moduli and very high elongations at break.

Because of their excellent mechanical characteristics, the vulcanized elastomers can be used advantageously in the preparation of manufactured shaped articles such as pipes, inner tubes, tapes, sheets, elastic threads, etc.

The copolymers can be extended or plasticized with hydrocarbon oils by known methods. Preferably, the hydrocarbon oils used with these copolymers are paraffinic or naphthenic. However, aromatic oils can also be employed.

The copolymers of this invention are obtained by co-polymerizing a mixture of the monomers in contact with a catalyst system which is highly dispersible, amorphous colloidally dispersible, or completely soluble in hydrocarbon solvents which can be used as the inert liquid copolymerization medium, which may be an aliphatic, cycloaliphatic or aromatic hydrocarbon, or mixtures thereof. The catalytic systems are prepared from (1) organometallic compounds or hydrides of metals belonging to Groups I to III, inclusive, of the Mendeleeff Periodic Table, complex organometallic compounds of said metals, or complex hydrides of a metal belonging to Group I or Group III of said Table; and (2) compounds of transition metals belonging to Group IV or Group V of said Table.

In the preparation of the catalyst, the following organometallic compounds and hydrides may be employed: lithium alkyls, lithium hydride, lithium-aluminum tetralkyls, lithium aluminum alkylhydrides, lithiumaluminum hydride, beryllium dialkyls, beryllium alkylhalides, beryllium diaryls, zinc dialkyls, zinc alkylhalides, zinc hydride, calcium hydride, cadmium dialkyls, cadmium diaryls, aluminum trialkyls, aluminum diakylmonohalides, aluminum monoalkyldihalides, aluminum alkylaryls, aluminum alkylenes, aluminum cycloalkyls, aluminum cycloalkylalkyls, aluminum aryls, aluminum alkylaryls, aluminum alkylhydrides, aluminum halohydrides, aluminum dialkylalkoxides, aluminum alkylalkoxyhalides, and complexes of the above listed organo aluminum compounds with preferably weak Lewis bases.

Examples of compounds falling within the group of organometallic compounds and hydrides listed above are: lithium butyl, lithium-aluminum tetrabutyl, lithium-aluminum tetrahexyl, lithium aluminum diisobutyl-dihydride, beryllium diethyl, beryllium methylchloride, beryllium dimethyl, beryllium di-t. butyl, beryllium diphenyl, zinc dimethyl, cadmium diisobutyl, cadmium diphenyl, aluminum triethyl, aluminum triisobutyl, aluminum trihexyl, aluminum diethylmonochloride, aluminum diethylmonoiodide, aluminum diethylmonofluoride, aluminum diisobutyl monochloride, aluminum monoethyl dichloride, aluminum butenyl diethyl, aluminum isohexenyldiethyl, 2-methyl1,4-di (diisobutyl-aluminum) butane, aluminum tri(dimethylcyclopentylmethyl), aluminum triphenyl, aluminum tritolyl, aluminum di(dicyclopentylmethyl) monochloride, aluminum diethylmonochloride complexed with anisole, aluminum diethyl monohydride, aluminum diisobutylmonohydride, aluminum monoethyldihydride, aluminum chlorohydride, aluminum monochloro monoethyl monoethoxide, aluminum diethylpropoxide, aluminum diethylamyloxide, aluminum diethylamyloxide, aluminum monochloromonopropyl monopropoxide, aluminum monochloro monopropylmonoethoxide.

The transition metal compound used with the above-mentioned organometallic compounds or hydrides are preferably compounds of titanium, niobium, tantalum or vanadium.

Titanium compounds which can be employed in the preparation of the catalyst are halides, (such as e.g., $TiCl_4$ and $TiI_4$) and those compounds wherein at least one of the metal valances is saturated by a heteroatom (particularly oxygen or nitrogen) linked to an organic group (such as e.g. titanium alcoholates, haloalcoholates, titanium acetylacetonate, tetrahydrofurnates, etherates, aminates, pyridinates and quinolinates of titanium tri- and tetrachloride).

Niobium and tantalum compounds which may be used are the halides or oxyhalides and, besides, those compounds wheren niobium and tantalum are linked at least by one valence to a heter-atom, in particular nitrogen or oxygen, attached to an organic group.

Non-restrictive examples of such compounds are $NbCl_5$, $NbCl_4$, $NbOCl_3$, $NbBr_5$, $NbOBr_3$, $TaCl_4$, $TaCl_5$ $TaOCl_3$, $TaBr_5$, $TaOBR_3$, $NbAcCl_2 (OC_2H_5)_2$, $NbAcCl_2$ $(OCH_3)_2$, $TaAcCl_2 (OC_2H_5)_2$ (wherein Ac designates the acetylacetonic radical).

Vanadium compounds, preferably hydrocarbon-soluble, which may be used in the preparation of the catalyst are the halides and oxyhalides (such as e.g. $VCl_4$, $VOCl_3$, $VBr_4$) and those compounds in which at least one of the metal valances is saturated by a hetero atom (in particular oxygen or nitrogen) linked to an organic group, such as e.g. vanadium triacetylacetonate and tribenzoylacetonate, vanadyl diacetylacetonate, halo acetylacetones. trialcoholates and haloalcoholates; tetrahydrofuranates, etherates, aminates pyridinates, quinolinates of vanadium tri-and tetrachloride and vanadyl trichloride.

Hydrocarbon insoluble vanadium compounds selected from organic salts, such as e.g. vanadium triacetate, tribenzoate and tristearate also can be used.

In practice, it is desirable to operate in the presence of halogen-containing catalytic systems in which at least one of the components contains at least one halogen atom and the preferred catalysts are those prepared from hydrocarbon - soluble vanadium compounds.

The copolymerization can be carried out at temperatures ranging from −80° to −125°C. When using catalysts prepared from vanadium triacetylacetonate, vanadyl diacetylacetonates and haloacetylacetonates, or in general from a vanadium compound such as e.g. $VCl_4$ or $VOCl_3$, in addition to those mentioned above, in the presence of aluminium alkylhalides, it is convenient to carry out both the preparation of the catalyst and the copolymerization at temperatures between 0° and −80°C, preferably between −10° and −50°C, in order to obtain high copolymer yields per unit by weight of catalyst used.

When operating under these conditions, the catalysts show a much higher catalytic activity than do the same catalytic systems prepared at higher temperatures. Furthermore, when operating within the above mentioned low temperature range, the activity of the catalyst remains practically unaltered with time.

If catalysts prepared from an aluminum alkylhalide and vanadium triacetylacetonate, vanadyl trialcoholate or haloalcoholate are used at temperatures ranging from 0° to 125°C, it is advisable to operate in the presence of particular complexing agents selected from ethers, thioethers, tertiary amines or trisubstituted phosphines containing at least a branched alkyl group or an aromatic nucleus, in order to obtain high copolymer yields. The complexing agent may be an ether of the formula RYR', wherein Y is oxygen or sulphur and R and R' each designate a linear or branched alkyl group containing 1 to 14 carbon atoms or an aromatic nucleus containing 6 to 14 carbon atoms, at least one of R and R' being a branched alkyl group or an aromatic nucleus.

The complexing agent can also be a tertiary amine of the formula

wherein R, R' and R'' each represent an alkyl group containing 1 to 14 carbon atoms or an aromatic nucleus containing from 6 to 14 carbon atoms at least one of R, R' and R'' being an aromatic nucleus.

The complexing agent can also be a tertiary phosphine

wherein R, R' and R'' each represent an alkyl radical containing from 1 to 14 carbon atoms or an aromatic nucleus containing 6 to 14 carbon atoms at least one of R, R' and R'' being an aromatic nucleus.

The amount of complexing agent ranges preferably from 0.05 to 1 mole per mole of aluminum alkylhalide.

The activity of the catalysts used in the present process varies with the molar ratio between the compounds employed in preparing the catalyst. We have found that when using e.g. aluminum trialkyls and vanadium halides or oxyhalides, it is advisable to employ catalysts in which the molar ratio of aluminum trialkyl to vanadium compound is between 1 and 5, preferably between 2 and 4, while with aluminum diethylmonochloride ($Al(C_2H_5)_2Cl$) and vanadium triacetylacetonate ($VAc_3$), the best results are reached with a molar ratio of $Al(C_2H_5)_2Cl/VAc_3$ ranging from 2 to 20, preferably from 4 to 10.

The copolymerization can be carried out in an aliphatic, cycloaliphatic or aromatic hydrocarbon solvent consisting of e.g. butane, pentene, n-heptene, cyclohexane, benzene, xylene or mixtures thereof. Halogenated hydrocarbons such as methylene chloride, chloroform, trichloroethylene, tetrachloroethylene dichloroethane and chlorobenzene etc. may be used.

Particularly high copolymerization rates can be obtained when the copolymerization is conducted in absence of an inert solvent, employing the monomers themselves in the liquid state, that is in a solution of ethylene in the higher alpha-olefins and the 1,4,9-decatrienes, maintained in the liquid state.

The most homogeneous copolymers are obtained when the ratio between the concentrations of the monomers being copolymerized in the reacting liquid phase is maintained constant, or as constant as possible during the copolymerization.

To this end it may prove convenient to carry out the copolymerization continuously, by continuously feeding and discharging a monomer mixture having constant composition and operating at high space velocity.

By varying the composition of the monomer mixture, the composition of the copolymers can be varied within wide limits.

If it is desired to obtain amorphous terpolymers of the disclosed decatrienes with ethylene and propylene, the ethylene-propylene molar ratio, in the reacting liquid phase, should be kept below or at most equal to 1:4, which corresponds to an ethylene-propylene molar ratio in the gas phase of 1:1 under normal conditions. Molar ratios between 1:200 and 1:4 are in general preferred.

If butene-1 is used instead of propylene, the ethylene-butene molar ratio has to be lower than or at most equal to 1:20, which corresponds to an ethylene-butene-1 molar ratio in the gas phase of 1:1.5 under normal conditions. Molar ratios in the liquid phase ranging from 1:1000 to 1:20 are normally preferred.

Operating under these conditions, there are obtained amorphous terpolymers containing less than 75% by mols of ethylene. If these values are exceeded the terpolymer shows a polyethylenic type crystallinity.

The lower limit on the ethylene content is not critical. However, it is preferred that the terpolymers contain at least 5% by mols of ethylene. The higher alpha-olefin content in the amorphous terpolymer can preferably range from a minimum of 5% by mols up to a maximum 95% by mols.

The content of the decatriene in the terpolymers preferably is between 0.1 and 30% by mols. This upper limit can be raised, but especially for ecomonical reasons, it is not convenient to introduce amounts greater than 30% by mols into the copolymer; on the other hand, when amorphous, binary copolymers of ethylene and the decatrienes are desired, the proportion of the triene must exceed 25% by mols.

The following examples serve to illustrate the invention in greater detail, without limiting the scope thereof.

EXAMPLE 1

The reaction apparatus consists of a glass cylinder having 7.5 cm diameter and 1,000 cc capacity, provided with a stirrer and gas inlet and outlet tubes. The gas inlet tube extends to the bottom of the vessel and terminates in a porous plate (3.5 cm in diameter). Into the reactor, kept at the constant temperature of −20°C, there are introduced 700 cc anhydrous n-heptane and 2.5 cc of 1,4,9-decatriene.

From the gas inlet tube a propylene-ethylene mixture having a molar ratio of 2:1 is sent in and circulated at a rate of 300 Nl/h.

The catalyst is preformed in a 100 cc flask by reacting 0.5 millimoles of vanadium tetrachloride and 2.5 millimoles of aluminum diethylmonochloride in 30 cc n-heptane under a nitrogen atmosphere and at −20°C.

The catalyst thus prepared in siphoned into the reactor by means of nitrogen pressure.

The ethylene-propylene mixture is continuously fed and discharged at a rate of 450 Nl/h.

About 6.5 minutes after addition of the catalyst, the reaction is stopped by addition of 10 cc of methanol containing 0.1 g of phenylbetanaphthylamine. The product is purified in a separatory funnel by repeated treatment with diluted hydrochloric acid, and then with water, after which it is coagulated in acetone.

After vacuum drying, 16 g of solid product, amorphous at the X-rays, which looks like an unvulcanized elastomer and is completely soluble in boiling n-heptane, are obtained.

Examination by infrared spectrography shows the presence of vinyl groups (bands at 10 and 11 microns) and of double bonds of the trans type (band at 10.35 micron).

The molar ratio of ethylene to propylene is about 1:1.

100 parts by weight of the ethylene-propylene-decatriene terpolymer are mixed on a laboratory roll mixer with 1.0 part of phenyl-beta-naphthylamine, 50 parts of HAF carbon black, 2 parts of sulphur, 5 parts of zinc oxide, 1 part of tetramethylthiuramdisulphide and 0.5 parts of mercaptobenzothiazole.

The mixture is vulcanized in a press at 150°C for 60 minutes. A vulcanized sheet having the following characteristics is obtained:

| | |
|---|---|
| ultimate tensile strength | 224 kg/cm$^2$ |
| elongation at break | 460% |
| modulus at 300% | 156 kg/cm$^2$ |
| residual set at break | 8% |

Another portion of the copolymer is vulcanized with the following mix (parts by weight referred to 100 parts by weight of copolymer):

| | |
|---|---|
| phenylbetanaphthylamine | 1 |
| sulphur | 2.5 |
| stearic acid | 1 |
| zinc oxide | 5 |
| HAF carbon black | 50 |
| cyclohexylbenzotriazylsulphenamide | 1 |

Vulcanization is carried out in a press at 150°C for 60 minutes. A vulcanized sheet having the following characteristics is obtained:

| | |
|---|---|
| ultimate tensile strength | 146 kg/cm$^2$ |
| elongation at break | 460% |
| modulus at 300% | 102 kg/cm$^2$ |

EXAMPLE 2

In the reaction apparatus as described in Example 1, kept at the constant temperature of −20°C, 700 cc anhydrous n-heptane and 2.5 cc 1,4,9-decatriene are introduced. From the gas inlet tube a propyleneethylene mixture having a molar ratio of 4:1 is sent in and circulated at a rate of 500 Nl/h.

The catalyst is prepared in a 100 cc flask by operating at −20°C under a nitrogen atmosphere and reacting 2.8 millimoles vanadium triacety-lacetonate and 14 millimols aluminum diethylmonochloride in 30 cc of anhydrous toluene.

The catalyst thus performed is kept at −20°C for 5 minutes and then siphoned into the reactor by means of nitrogen pressure. The ethylenepropylene mixture is continuously fed and discharged at a rate of 500Nl/h. After 13 minutes, the reaction is stopped by addition of 10 cc of methanol containing 0.1 g of phenylbetanaphthylamine.

After drying in vacuum, there are obtained 2 g of solid product which is amorphous at the X-rays, has the aspect of an unvulcanized elastomer and is completely soluble in boiling n-heptane.

Analysis by infrared spectrography reveals the presence of vinyl groups (bands at 10 and 11 micron) and of double bonds of the trans type (band at 10.35 micron). Mooney viscosity ML (1+4) at 100°C is 87.

100 parts by weight of this terpolymer are mixed on a laboratory roll mixer with 50 parts of HAF carbon black, 1 part of phenylbetanaphthylamine, 2 parts of sulphur, 5 parts of zinc oxide, 1 part of tetramethylthiuramdisulphide and 0.5 part of mercaptobenzothiazole.

The mixture is vulcanized in a press at 150°C for 60 minutes. The vulcanized sheet thus obtained has the following characteristics:

| | |
|---|---|
| ultimate strength | 246 kg/cm² |
| elongation at break | 460 % |
| MODULUS AT 300% | 120 kg.cm² |
| residual set at break | 8 % |

EXAMPLE 3

Into the reaction apparatus as described in Example 1, kept at the constant temperature of −20°C, 700 cc of anhydrous n-heptane and 5cc of 1,4,9-decatriene are introduced.

Through the gas inlet a tube propylene-ethylene mixture having a molar ratio of 2:1 is sent in and circulated at a rate of 450 Nl/h.

The catalyst is preformed in a 100 cc flask by operating at −20°C under a nitrogen atmosphere and reacting 1 millimole of vanadium tetrachloride and 5 millimoles of aluminum diethylmonochloride in 20 cc of anhydrous n-heptane. The catalyst thus preformed is siphoned into the reactor by means of nitrogen pressure. The ethylene-propylene mixture is continuously fed and discharged at a rate of 450Nl/h. After 4 minutes, the reaction is stopped by addition of 10 cc of methanol containing 0.1 g of phenylbetanaphthylamine. The product is purified in a separatory funnel as in Example 1.

After vacuum drying, there are obtained 15 gms. of solid product which is amorphous at the X-rays, has the aspect of an unvulcanized elastomer, and is completely soluble in boiling n-heptane.

Examination by infrared spectrography shows the presence of vinyl groups (bands at 10 and 11 micron) and of double bonds of the trans type (band at 10.35 micron).

The molar ratio of ethylene to propylene is about 1:1.

100 parts by weight of this terpolymer are mixed on a laboratory roll mixer, with 1 part phenylbetanaphthylamine, 50 parts HAF carbon black, 2.5 parts of sulphur, 1 part of stearic acid, 5 parts of zinc oxide, and 1 part of cyclohexylbenzothiazylsulphenamide.

The mixture is vulcanized in a press at 150°C for 60 minutes.

A vulcanized sheet having the following characteristics is obtained:

| | |
|---|---|
| ultimate tensile strength | 190 kg/cm² |
| elongation at break | 480% |
| modulus at 300% | 110 kg/cm² |

50 parts by weight of the terpolymer are mixed with 50 parts of butadiene-styrene rubber. The mixture is co-vulcanized with the mix and following the same procedure as used above for the vulcanization of the terpolymer alone. A vulcanized sheet having the following characteristics is obtained:

| | |
|---|---|
| ultimate tensile strength | 160 kg/cm² |
| elongation at break | 400 % |
| modulus at 300% | 100 kg/cm² |

EXAMPLE 4

The reaction apparatus consists of a 3-necked, 100 cc pearshaped flask provided with a stirrer and gas inlet and outlet tubes, kept at the constant temperature of −20°C. 25 cc of anhydrous n-heptane and 15 cc of 1,4,9-decatriene are introduced into the reactor.

From the gas inlet tube a radioactive ethylene-nitrogen mixture having a molar ratio of 1:6 is sent in and circulated at a rate of 60 Nl/h. The catalyst is preformed in a 100 cc flask by operating at −20°C and reacting 2 millimoles of vanadium tetrachloride and 10 millimoles of aluminum diethylmonochloride in 15 cc anhydrous n-heptane. The catalyst thus preformed is siphoned into the reactor by means of nitrogen pressure. The ethylenenitrogen mixture is continuously fed and discharged at a rate of 60 Nl/h.

After 30 minutes, the reaction is stopped by addition of 10 cc of methanol containing 0.1 g of phenylbetanaphthylamine. The product is purified and isolated as described in Example 1.

After vacuum drying, there is obtained 0.8 g of solid product, which is amorphous at the X-rays, has the aspect of an unvulcanized elastomer, and is completely soluble in boiling n-heptane.

Radiochemical analysis of the copolymer shows the presence therein of 23.6% by weight of ethylene, corresponding to 60% by mols. Examination by infrared spectrography shows the presence of vinyl groups (bands at 10 and 11 micron) and of trans double bonds. (bands at 10.35 micron).

EXAMPLE 5

In reaction apparatus as described in Example 1, kept at the constant temperature of −20°C, 700 cc of anhydrous n-heptane and 2.5 cc of 1,4,9-decatriene are introduced.

Through the gas inlet tube a propylene-ethylene mixture having a molar ratio of 2:1 is sent in and circulated at a rate of 360 Nl/h. The catalyst is preformed in a 100 cc flask by operating at −20°C under nitrogen atmosphere and reacting 0.5 millimoles of vanadium tetrachloride and 2.5 millimoles of aluminum ethylsesquichloride 1/2 Al$_2$Et$_3$ Cl$_3$ in 30 cc anhydrous n-heptane.

The catalyst thus preformed is siphoned into the reactor by means of nitrogen pressure. The propylene-ethylene mixture is continuously fed and discharged at a rate of 450 Nl/h. After 7 minutes, the reaction is stopped by addition of 10 cc methanol containing 0.1 g of phenylbetanaphthylamine. The product is purified and isolated as described in Example 1.

After vacuum drying, there are obtained 21 gr of a solid terpolymer which is amorphous at the X ays, has the aspects of an unvulcanized elastomer, ...d is completely soluble in boiling n-heptane.

Examination by infrared spectrography reveals the presence of vinyl groups (bands at 10 and 11 microns) and of trans double bonds (band at 10.35 micron).

The molar ratio of ethylene to propylene is about 1:1.

The terpolymer is vulcanized with the same mix and according to the same procedure as in Example 2 to obtain a vulcanized sheet having the following characteristics:

| | |
|---|---|
| tensile strength | 210 kg/cm² |
| elongation at break | 450% |
| modulus at 300% | 145 kg/cm² |

EXAMPLE 6

In reaction apparatus as described in Example 1, kept at the constant temperature of −20°C, 700 cc of anhydrous n-heptane and 2.5 cc of 1,4,9-decatriene are placed.

Through the gas inlet tube a propylene-ethylene mixture having a molar ratio of 3:1 is sent in and circulated at a rate of 400 Nl/h.

The catalyst is prepared in a 100 cc flask by operating at −20°C under nitrogen atmosphere and reacting 1 millimole $VOCl_3$ and 5 millimoles of aluminum diethylmonochloride in 30 cc of anhydrous n-heptane.

The catalysts thus preformed is siphoned into the reactor by means of nitrogen pressure. The ethylene-propylene mixture is continuously fed and discharged at a rate of 400 Nl/h. After 8 minutes, the reaction is stopped by addition of 10 cc of methanol containing 0.1 g of phenylbetanaphthylamine. The product is purified and isolated as described in Example 3.

After vacuum drying, there are obtained 18 gms. of solid terpolymer which is amorphous at the X-rays, looks like an unvulcanized elastomer, and is completely soluble in boiling n-heptane.

Examination by infrared spectrography shows the presence of vinyl groups (bands at 10 and 11 micron) and of trans double bonds (band at 10.35 micron). The molar ratio of ethylene to propylene is about 1:1.

EXAMPLE 7

In reaction apparatus as described in Example 3, kept at the constant temperature of −20°C, 200 cc of anhydrous n-heptane and 1 cc of 1,4,9-decatriene are introduced. Through the gas inlet tube a propylene-ethylene mixture having 2:1 molar ratio is sent in and circulated at a rate of 300Nl/h. In a 100 cc flask the catalyst is preformed by operating at −20°C under nitrogen atmosphere and reacting 0.5 millimoles of vanadium tetrachloride and 1.25 millimoles of aluminum triexyl in 30 cc anhydrous n-heptane. The catalyst thus prepared is siphoned into the reactor by means of nitrogen pressure. The ethylene-propylene mixture is continuously fed and discharged at a rate of 450 Nl/h.

After 3 minutes, the reaction is stopped by addition of 10 cc of methanol containing 0.1 g of phenylbetanaphthylamine. The product is purified and isolated as described in Example 3.

After drying in vacuum, 4.5 gms. of solid terpolymer which is amorphous at the X-rays, has the aspect of an unvulcanized elastomer, and is completely soluble in boiling n-heptane, are obtained.

Examination by infrared spectrography reveals the presence of vinyl groups (bands at 10 and 11 micron) and of trans double bonds (band at 10.35 micron).

The ethylene-propylene-decatriene terpolymer is vulcanized with the same mix and according to the same procedure described in Example 2. A vulcanized sheet having the following characteristics is obtained:

| | |
|---|---|
| ultimate tensile strength | 260 kg/cm² |
| elongation at break | 360% |
| modulus at 300% | 217 kg/cm² |

EXAMPLE 8

Into reaction apparatus as described in Example 1, kept at the constant temperature of −10°C, 200 cc of anhydrous n-heptane and 1 cc of 1,4,9-decatriene are introduced, Through the gas inlet tube an ethylene-butene -1 mixture having a molar ratio of 1:3 is sent in and circulated at a rate of 400 Nl/h. In a 100 cc flask the catalyst is preformed by operating at −10°C under nitrogen atmosphere and reacting 0.5 millimoles of vanadium tetrachloride and 2.5 millimoles aluminum diethylmonochloride in 30 cc anhydrous n-heptane. The catalyst thus prepared is siphoned into the reactor by means of nitrogen pressure. The ethylene-butene mixture is continuously fed and discharged at a rate of 400 Nl/h.

After 6 minutes the reaction is stopped by addition of 10 cc of methanol containing 0.1 g of phenylbetanaphthylamine. The product is purified and isolated as described in Example 1.

After vacuum drying, 7 g of solid product, amorphous at the X-rays, which looks like an unvulcanized elastomer and is completely soluble in boiling n-heptane, are obtained.

Analysis by infrared spectrography shows the presence of vinyl groups (bands at 10 and 11 micron), of trans double bonds (band at 10.35 micron), of ethyl groups (band at 13 micron) and of methylene sequences of different length (region between 13 and 14 micron).

EXAMPLE 9

In reaction apparatus as described in Example 3, kept at the constant temperature of +20°C, 200 cc of anhydrous n-heptane and 1 cc of 1,4,9-decatriene are introduced. Through the gas inlet tube a propyleneethylene mixture having 2:1 molar ratio is sent in and circulated at a rate of 300 Nl/h. In a 100 cc flask the catalyst is preformed by operating at 25°C under nitrogen atmosphere and reacting 0.5 millimoles of vanadium tetrachloride and 2.5 millimoles aluminum diethylmonochloride in 30 cc anhydrous n-heptane. The catalyst thus prepared is siphoned into the reactor by means of nitrogen pressure.

The ethylene-propylene mixture is continuously fed and discharged at a rate of 300 Nl/h. After 10 minutes the reaction is stopped by addition of 10 cc of methanol containing 0.1 g of phenylbetanaphthylamine. The product is purified and isolated as described in Example 3.

After drying in vacuum, there are obtained 5 gms. of solid terpolymer which is amorphous at the X-rays, looks like an unvulcanized elastomer, and is completely soluble in boiling n-heptane.

Examination of the terpolymer by infrared spectrography shows the presence of vinyl groups (bands at 10 and 11 micron) and of trans double bonds (band at 10.35 micron). The ethylene-propylene molar ratio is about 1:1.

EXAMPLE 10

In reaction apparatus as described in Example 3, kept at the constant temperature of −20°C, 200 cc of anhydrous n-heptane and 1 cc of 1,4,9-decatriene are introduced.

A propylene-ethylene mixture having a molar ratio 2:1 is sent in through the gas inlet tube and circulated at a rate of 300 Nl/h. The catalyst is preformed in a 100 cc flask by operating at −20°C under nitrogen atmosphere and reacting 0.5 millimoles vanadium tetrachloride and 1.5 millimoles of beryllium diethyl, in 30 cc anhydrous n-heptane.

The catalyst thus prepared is siphoned into the reactor by nitrogen pressure. The ethylene-propylene mixture is continuously fed and discharged at a rate of 450 Nl/h. After five minutes, the reaction is stopped by addition of 10 cc of methanol containing 0.1 g of phenylbetanaphthylamine. The product is purified and isolated as described in Example 3. After vacuum drying, the yield of terpolymer amounts to 4 gms. The terpolymer is solid, amorphous at the X-rays, looks like an unvulcanized elastomer, and is completely soluble in boiling n-heptane.

Examination of the terpolymer by infrared spectrography shows the presence of trans double bonds (band at 10.35 micron) and of vinyl groups (bands at 10 and 11 micron). The ethylene to propylene molar ratio is of about 1:1.

EXAMPLE 11

In reaction apparatus as described in Example 3, kept at the constant temperature of −20°C, 200 cc anhydrous n-heptane and 1 cc of 1,4,9-decatriene are introduced. Through the gas inlet tube a propylene-ethylene mixture having a molar ratio of 4:1 is sent in and circulated at a rate of 250 Nl/h.

The catalyst is preformed in 100 cc flask by operating at −20°C under nitrogen atmosphere and reacting 2 millimoles of titanium tetrachloride and 5 millimoles of aluminum trihexyl in 30 cc of anhydrous n-heptane.

The catalyst thus prepared is siphoned into the reactor by means of nitrogen pressure. The ethylene-propylene mixture is continuously fed and discharged at a rate of 250 Nl/h. After 60 minutes the reaction is stopped by addition of 10 cc of methanol containing 0.1 g of phenylbetanaphthylamine. The product is purified and isolated as described in Example 3.

After vacuum drying, 7.5 gms. of solid terpolymer, amorphous at the X-rays, having the appearance of an unvulanized elastomer, and being completely soluble in boiling n-heptane are obtained.

Examination of this terpolymer by infrared spectrography shows the presence of trans double bonds (band at 10.35 micron) and of vinyl groups (bands at 10 and 11 micron).

The ethylene to propylene molar ratio is about 1:1.

The terpolymer is vulcanized with the same mix and using the same procedure described in Example 2. A vulcanized sheet having the following characteristics is obtained:

| | |
|---|---|
| tensile strength | 136 kg/cm² |
| elongation at break | 420 % |
| modulus at 300 % | 102 kg/cm² |

EXAMPLE 12

The reaction apparatus consists of a glass cylinder having a diameter of 5.5 cm and a 700 cc capacity, provided with a stirrer and inlet and outlet gas tubes. The inlet tube reaches the bottom of the cylinder and ends in a porous plate (3.5 cm diameter). 200 cc of anhydrous n-heptane and 15 cc of 1-phenyl decatriene-1,4,9 are introduced into the reactor kept at the constant temperature of −20°C.

Through the gas inlet tube a propylene-ethylene gaseous mixture having a molar ratio of 3:1 is sent in and circulated at a rate of 400 Nl/h.

The catalyst is preformed in a 100 cc flask by reacting 2 millimols of vanadyl trichloride and 10 millimoles of aluminum diethylmonochloride in 30 cc of anhydrous n-heptane and operating at the temperature of −20°C under nitrogen.

The catalyst thus preformed is siphoned into the reactor by means of nitrogen pressure. The propylene-ethylene gaseous mixture is continuously fed and discharged at a rate of 400Nl/h.

After 60 minutes, the reaction is stopped by addition of 10 cc of methanol containing 0.1 g phenylbetanaphthylamine.

The product is purified in a separatory funnel under nitrogen by repeated treatment with dilute hydrochloric acid and then with water, and coagulated in acetone. After vacuum drying, 4.4 gms. of solid terpolymer amorphous at the X-rays, having the appearance of an unvulcanized elastomer, and being completely soluble in boiling n-heptane, are obtained.

Infrared spectrographic analysis shows the presence of phenyl groups (band at 6.25 micron). The molar ratio of ethylene to propylene is about 1:1.

100 pp by weight of the ethylene-propylene-phenyl decatriene terpolymer are mixed in a laboratory roll mixer with:

| | |
|---|---|
| phenylbetanaphthylamine | 1 p |
| sulphur | 2 pp |
| zinc oxide | 5 pp |
| tetramethylthiuramdisulphide | 1 p |
| mercaptobenzathiazole | 0.5 pp |

The mix is vulcanized in a press for 60 minutes at 150°C. A vulcanized sheet having the following characteristics is obtained:

| | |
|---|---|
| tensile strength | 48 kg/cm² |
| elongation at break | 640% |
| modulus at 300 % | 26 kg/cm² |

EXAMPLE 13

Into reaction apparatus as described in Example 12, kept at the constant temperature of −20°C, 200 cc anhydrous n-heptane and 10 cc of 1-phenyl-decatriene-1, 4, 9, are introduced. Through the gas inlet tube a propylene-ethylene gaseous mixture having a molar ratio of 2:1 is sent in and circulated at a rate of 450 Nl/h.

The catalyst is prepared in a 100 cc flask by operating at −20°C under nitrogen, and reacting 1 millimole of vanadium tetrachloride and 2.5 millimoles aluminum trihexyl in 30 cc anhydrous n-heptane.

The catalyst thus obtained is siphoned into the reactor by means of nitrogen pressure. The propylene-ethylene gaseous mixture is continuously fed and discharged at a rate of 450 Nl/h.

After 9 minutes the reaction is stopped by addition of 10 cc methanol containing 0.2 g phenylbetanaphthylamine. The product is purified and isolated as described in Example 1. After vacuum drying, 3.8 g of a solid product, amorphous at the X-rays, which looks like an unvulcanized elastomer and is completely soluble in boiling n-heptane are obtained.

The infrared spectrographic analysis of this terpolymer shows the presence of phenyl groups (band at 6.25 micron).

The molar ratio of ethylene-propylene is equal to 1.

The terpolymer is vulcanized with the mix and according to the procedure of example 1, with the addition of 50 parts by weight of HAF carbon black. A vulcanized sheet having the following characteristics is obtained:

| ultimate tensile strength | 123 kg/cm² |
| elongation at break | 330 % |
| modulus at 300 % | 114 kg/cm² |
| permanent set after break | 15% |

EXAMPLE 14

Into the reaction apparatus as described in Example 12, kept at the constant temperature of −20°C, 200 cc anhydrous n-heptane and 5 cc 1-phenyl-decatriene-1, 4, 9 are introduced. A gaseous propylene-ethylene mixture having a molar ratio of 2:1 is sent in through the gas inlet tube and circulated at a rate of 450 Nl/h. The catalyst is preformed by reacting 1 millimole of vanadium tetrachloride and 5 millimoles of aluminum diethylmonochloride in 30 cc of anhydrous n-heptane, in a 100 cc flask, at the constant temperature of −20°C and under nitrogen pressure.

The catalyst thus prepared is siphoned into the reactor by means of nitrogen pressure. The gaseous ethylene-propylene mixture is continuously fed and discharged at a rate of 450 Nl/h.

After 30 minutes, the reaction is stopped by addition of 10 cc of methanol containing 0.1 g phenylbetanaphthylamine. The product is purified and isolated as described in Example 1.

After vacuum drying, 3 gms. of solid terpolymer which is amorphous at the X-rays, completely soluble in boiling n-heptane, and looks like an unvulcanized elastomer, are obtained.

Infrared spectrographic examination of this terpolymer shows the presence therein of phenyl groups (band at 6.25 micron). The molar ratio of ethylene to propylene is approximately 1:1.

EXAMPLE 15

Into reaction apparatus as described in Example 12, kept at the constant temperature of −20°C, 200 cc of anhydrous n-heptane and 5 cc of 1-phenyldecatreine-1, 4, 9 are introduced.

Through the gas inlet tube a gaseous propylene-ethylene mixture having a molar ratio of 2:1 is sent in and circulated at a rate of 450 Nl/h.

In a 100 cc flask, the catalyst is prepared by operating under nitrogen at −20°C and reacting 1 millimole of vanadium tetrachloride and 5 millimoles of aluminum ethylsesquichloride 1/2 Al$_2$ Et$_3$ Cl$_3$ in 30 cc of anhydrous n-heptane.

The catalyst thus preformed is siphoned into the reactor by means of nitrogen pressure. The ethylene-propylene mixture is continuously fed and discharged at a rate of 450 Nl/h.

After 60 minutes, the reaction is stopped by addition of 10 cc of methanol containing 0.1 g of phenylbetanaphthaylamine. The product is purified and isolated following the procedure of Example 1.

After vacuum drying, 3.3 gms. of solid product, which is amorphous at the X-rays, looks like an unvulcanized elastomer, and is completely soluble in boiling n-heptane, are obtained.

Infrared spectrographic analysis shows the presence of phenyl groups (bands at 6.25 micron). The molar ratio of ethylene to propylene is approximately 1:1.

EXAMPLE 16

Into reaction apparatus as used in Example 12, kept at the constant temperature of −20°C, 200 cc of anhydrous n-heptane and 10 cc of 1-phenyldecatriene-1, 4, 9 are introduced.

Through the gas inlet tube a gaseous propylene-ethylene stream having a molar ratio of 2:1 is sent in and circulated at a rate of 300 Nl/h.

In a 100 cc flask the catalyst is prepared by operating at −20°C under nitrogen and reacting 1 millimole of vanadium tetrachloride and 4 millimoles of beryllium diethyl in 30 cc of anhydrous n-heptane. The catalyst thus preformed is siphoned into the reactor by means of nitrogen pressure. The ethylene-propylene mixture is continuously fed and discharged at a rate of 450 Nl/h. 450

After 12 minutes, the reaction is stopped by addition of 10 cc of methanol containing 0.2 g of phenylbetanaphthylamine. The product is purified and isolated as described in Example 1.

After vacuum drying, there are obtained 3.5 gms. of a solid terpolymer which is amorphous at the X-rays, looks like an unvulcanized elastomer, and is completely soluble in boiling n-heptane.

Infrared spectrographic examination of this terpolymer shows the presence therein of phenyl groups (band at 6.25 micron). The molar ratio of ethylene to propylene is equal to 1.

The terpolymer is vulcanized with the same mix and the same procedure as described in Example 2. A vulcanized sheet having the following characteristics is obtained:

| tensile strength | 140 kg/cm² |
| elongation at break | 440 % |
| modulus at 300% | 110 kg/cm² |

EXAMPLE 17

Into reaction apparatus as described in Example 12, kept at the constant temperature of −20°C, 200 cc of anhydrous n-heptane and 10 cc 1-phenyl-decatriene-1, 4, 9 are introduced.

Through the gas inlet tube an ethylene-butene-1 mixture having a molar ratio of 1:3, is sent in and circulated at a rate of 200 Nl/h.

The catalyst is preformed in a 100 cc flask by operating at −10°C under nitrogen and reacting 1 millimole vanadium tetrachloride and 2.5 millimoles aluminum trihexyl in 30 cc anhydrous n-heptane.

The catalyst preformed is siphoned into the reactor by means of nitrogen pressure. The ethylene-butene-1 mixture is continuously fed and discharged at a rate of 200 Nl/h.

After 15 minutes, the reaction is stopped by addition of 10 cc of methanol containing 0.1 g of phenylbetanaphthylamine. The product is purified and isolated as described in Example 1.

After vacuum drying, there are obtained 4 gms. of a solid terpolymer which is amorphous at the X-rays, looks like an unvulcanized elastomer, and is completely soluble in boiling n-heptane.

The analysis by infrared spectrography shows the presence of phenyl groups (band at 6.225 micron) in this terpolymer.

The terpolymer is vulcanized with the same mix and according to the same procedure as in Example 1. A vulcanized sheet having the following characteristics is obtained:

| | | |
|---|---|---|
| tensile strength | 32 kg/cm$^2$ | |
| elongation at break | 540% | |
| modulus at 300% | 14 kg/cm$^2$ | |

EXAMPLE 18

The reaction apparatus consists of a glass cylinder having 10 cm diameter and 3500 cc capacity, provided with a stirrer and gas inlet and outlet tubes. The gas inlet reaches the bottom of the vessel and ends with a porous plate (5 cm diameter).

Into the apparatus, kept at the constant temperature of −20°C 200 cc of anhydrous n-heptane and 7.5 cc of 1.4.9-decatriene are introduced. Through the gas inlet tube an ethylene-propylene mixture having molar ratio 2:1 is sent in and circulated at a rate of 40 l/h.

The catalyst is preformed in a 100 cc flask by operating at −20°C under nitrogen and reacting 3 millimoles of vanadium tetrachloride and 15 millimoles of aluminum monochloride in 50 cc anhydrous n-heptane. The catalyst thus preformed is siphoned into the reactor by means of nitrogen pressure. The ethylene-propylene mixture is continuously fed and discharged at a rate of 1200 Nl/h and hydrogen is contemporaneously fed and discharged at a rate of 40 l/h. After 5.5 minutes the reaction is stopped by adding 30 cc of methanol, containing 0.1 g of phenylbetanaphthylamine.

The product is purified and isolated as described in Example 1. After vacuum drying, there are obtained 7.5 gms. of solid product, amorphous at the X-rays, completely soluble in boiling n-heptane, and which looks like an unvulcanized elastomer.

Analysis of this terpolymer by infrared spectrography shows the presence of vinyl groups (band at 10 and 11 micron) and of trans double bonds (band at 10.35 micron). The Mooney viscosity ML (1 + 4), measured at 100°C, is 67.

The ethylene-propylene-decatriene terpolymer is vulcanized using the same mix described in Example 2. The vulcanization is carried out at 150°C for different times. The properties of the vulcanizates are reported in the following table.

| Time (minutes) | 15 | 30 | 60 | 90 | 120 | 240 |
|---|---|---|---|---|---|---|
| tensile strength (kg/cm$^2$) | 112 | 143 | 164 | 180 | 176 | 176 |
| elongation at break (%) | 390 | 340 | 300 | 300 | 300 | 300 |
| modulus at 300% (kg/cm$^2$) | 89 | 128 | 164 | 180 | 176 | 176 |
| permanent set at break (%) | 8 | 6 | 6 | 4 | 4 | 4 |

EXAMPLE 19

Into reaction apparatus as described in Example 1, kept at the constant temperature of −20°C, 700 cc of anhydrous n-heptane and 2.5 cc of 1, 4, 9-dectriene are introduced. Through the gas inlet tube an ethylenepropylene mixture having molar ratio 1:2 is injected and circulated at a rate of 300 Nl/h.

The catalyst is preformed in a 100 cc flask by operating at −20°C under nitrogen and reacting 1 millimole vanadium tetrachloride and 5 millimoles of aluminum diethylmonohydride in 30 cc anhydrous n-heptane. The catalyst thus prepared is siphoned into the reactor by means of nitrogen pressure. The ethylene-propylene mixture is continuously fed and discharged at a rate of 300 Nl/h.

After 10 minutes, the reaction is 2 gms. adding 20 cc of methanol containing 0.1 g of phenylbethanaphthylamine. The product is purified and isolated n-heptane, described in Example 1.

After vacuum drying, there are obtained 2 gms, of solid terpolymer. This terpolymer is amorphous when examined under the X-rays, completely soluble in boiling n-hetane, and looks like an unvulcanized elastomer.

The examination by infrared spectrography shows the presence of vinyl groups (bands at 10 micron and 11 micron) and of trans double bonds (band at 10.35 micron).

The terpolymer is vulcanized with the same mix and according to the same mode of operation of Example 2. A vulcanized sheet is obtained having the following characteristics:

| | |
|---|---|
| tensile strength | 187 kg/cm |
| elongation at break | 480 % |
| modulus at 300% | 143 kg/cm$^2$ |

EXAMPLE 20

Into reaction apparatus as described in Example 4, kept at the constant temperature of −20°°C, 25 cc of anhydrous n-heptane and 15 cc of 1, 4, 9-decatriene are introduced. From the gas inlet tube a (radioactive) ethylene-nitrogen mixture having molar ratio 1:15 is sent in and circulated at a rate of 60 Nl/h.

The catalyst is preformed by reacting 2 millimoles of VOCl$_3$ and 10 millimoles of aluminum diethylmonochloride in 15 cc of anhydrous n-heptane, in a 50 cc flask. The catalyst thus preformed is siphoned into the reactor by means of nitrogen pressure. The radioactive ethylene-nitrogen mixture is continuously fed and discharged at a rate of 60 Nl/.h. After 2 hours, the reaction is stopped by addition of 10 cc of methanol containing 0.1 g of The product is purified and isolated as described in Example 1.

After vacuum drying, 2.2 g of solid ethylene/1, 4, 9-dectriene copolymer are obtained: it is amorphous when subjected to X-rays examination.

Radiochemical analysis of this copolymer shows the presence therein of 13.5% by weight of ethylene, corresponding to 43% by mols. The examination by infrared spectrography shows the presence of vinyl groups (band at 10 and 11 microns) and trans double bonds (band at 10.35 micron).

EXAMPLE 21

The reaction apparatus consists of a glass cylinder having a diameter of 10 cm and a capacity of 3500 cc provided with a stirrer and gas inlet and outlet tubes. The gas inlet tube reaches the bottom of the vessel and ends in a porous plate (5 cm diameter).

Into the reaction apparatus, kept at the constant temperature of 25°C, there are introduced 3,000 cc of anhydrous n-heptane and 10 cc of 1, 4, 9-decatriene.

From the gas inlet tube a propylene-ethylene mixture having molar ratio 3:1 is injected and circulated at a rate of 200 Nl/h.

The catalyst is preformed by reacting 6 millimoles of vanadyl trichloride and 30 millimoles of aluminum ethyl sesquichloride (1/2 Al$_2$ (C$_2$H$_5$)$_3$ Cl$_3$) in 100 cc anhydrous n-heptane, in a 250 cc flask at 25°C, and under nitrogen.

The catalyst thus preformed is siphoned into the reactor by means of nitrogen pressure. The ethylene-propylene mixture is continuously fed and discharged at a rate of 200 Nl/h.

60 minutes after addition of the catalyst, the reaction is stopped by adding 10 cc of methanol containing 0.1 g of The product is purified and isolated as described in Example 1.

After vacuum drying, there are obtained 33.4 gms. of a solid terpolymer which is amorphous at the X-rays, looks like an unvulcanized elastomer, and is completely soluble in boiling n-heptane.

Examination by infrared spectrography shows the presence in this terpolymer of vinyl groups (bands at 10 and 11 microns) and of double bonds of trans type (band at 10.35 micron). The molar ratio of ethylene to propylene is about 1. The Mooney viscosity ML (1 + 4), measured at 100°C, is 101.

100 parts by weight of this terpolymer are vulcanized with the first mix used in Example 1 for different periods of time. The properties of the vulcanized products are shown in the following table:

| Time (minutes) | 15 | 30 | 60 | 90 | 120 | 240 |
|---|---|---|---|---|---|---|
| Elongation at break (%) | 400 | 360 | 300 | 280 | 280 | 260 |
| Tensile strength (kg/cm$^2$) | 144 | 175 | 168 | 170 | 185 | 174 |
| Modulus at 200% (kg/cm$^2$) | 75 | 84 | 102 | 120 | 124 | 126 |
| Modulus at 300% (kg/cm$^2$) | 113 | 144 | 168 | — | — | — |
| Permanent set (%) | 14 | 14 | 12 | 10 | 8 | 8 |

Seventy parts by weight of the terpolymer admixed with 30 parts of Circosol 2HX are julcanized with the same mix for different periods of time. The properties of the vulcanizates are the following:

| Time (minutes) | 15 | 30 | 60 | 90 | 120 | 240 |
|---|---|---|---|---|---|---|
| Tensile strength (kg/cm$^2$) | 130 | 160 | 170 | 170 | 160 | 160 |
| Elongation at break (%) | 620 | 500 | 440 | 420 | 380 | 380 |
| Modulus at 200% (kg/cm$^2$) | 30 | 50 | 59 | 65 | 66 | 67 |
| Modulus at 300% (kg/cm$^2$) | 57 | 87 | 108 | 112 | 120 | 123 |
| Permanent set (%) | 40 | 22 | 22 | 20 | 16 | 16 |

EXAMPLE 22

Into reaction apparatus described in Example 12, kept at the constant temperature of 25°C, there are introduced 3000 cc of anhydrous n-heptane and 12 cc of 1,4,9-decatriene. Through the gas inlet tube a propylene-ethylene stream having molar ratio 2:1 is sent in and circulated at a rate of 300 Nl/h.

The catalyst is formed in the reactor by first adding millimoles (30) of aluminium ethyldichloride and then 6 millimoles of vanadium oxytrichloride.

The ethylene-propylene mixture is continuously fed and discharged at a rate of 300 Nl/h.

60 minutes after addition of the catalyst, the reaction is stopped by adding 20 cc of methanol containing 0.2 g of phenylbetanaphthylamine. The product is purified and isolated as described in Example 1.

After vacuum drying there are obtained 42.8 gms. of solid terpolymer which is amorphous at the X-rays, looks like an unvulcanized elastomer, and is completely soluble in boiling n-heptane. Analysis of this terpolymer by infrared spectrography shows the presence of vinyl groups (bands at 10 and 11 micron) and of trans double bonds (band at 10.35 micron). The molar ratio of ethylene to propylene is about 1. The Mooney viscosity, measured at 100°C, is 22.

The terpolymer is vulcanized at 150°C with the first mix of Example 1 for different times. The mechanical characteristics of the vulcanizates thus obtained are shown in the following table:

| Time (minutes) | 15 | 30 | 60 | 90 | 120 | 240 |
|---|---|---|---|---|---|---|
| Tensile strength (kg/cm$^2$) | 104 | 152 | 160 | 165 | 170 | 154 |
| Elongation at break (%) | 500 | 460 | 470 | 380 | 400 | 400 |
| Modulus at 200% (kg/cm$^2$) | 42 | 58 | 70 | 74 | 77 | 78 |
| Modulus at 300% (kg/cm$^2$) | 70 | 101 | 115 | 120 | 120 | 122 |
| Permanent set (%) | 20 | 16 | 16 | 10 | 12 | 10 |

EXAMPLE 23

Into reaction apparatus as described in Example 12, kept at the constant temperature of −20°C, there are introduced 2100 cc of anhydrous n-heptane, 12 cc of 1,4,9-decatriene and 6 millimoles of zinc diethyl as molecular weight regulator. Through the gas inlet tube a propylene-ethylene mixture having molar ratio 3:1 is injected and circulated at a rate of 1200 Nl/h.

The catalyst is preformed in a 250 cc flask by operating at −20°C under nitrogen and reacting 4 millimoles vanadyl trichloride and 10 millimoles of Al ethylsesquichloride (1/2 Al$_2$ (C$_2$H$_5$)$_3$Cl$_3$) in 100 cc of anhydrous n-heptane. The catalyst thus preformed is siphoned into the reactor by means of nitrogen pressure. The ethylene-propylene mixture is continuously fed and discharged at a rate of 1200 Nl/h.

35 minutes after introduction of the catalyst the reaction is stopped by adding 20 cc of methanol containing 0.2 g of phenylbetanaphthylamine. The product is purified and isolated as described in Example 1.

After vacuum drying, there are obtained 63.3 gms. of solid terpolymer which is amorphous at the X-rays, looks like an unvulcanized elastomer, and is completely soluble in boiling n-heptane.

Analysis by infrared spectrography shows the presence of vinyl groups (band at 10 and 11 microns) and of trans double bonds (band at 10.35 micron).

The molar ratio of ethylene to propylene is approximately 1. The Mooney viscosity ML (1 + 4), measured at 100°C, is 84.

The terpolymer is vulcanized at 150°C with the first mix described in Example 1 for different times. The mechanical properties of the vulcanizates obtained are shown in the following table:

| Time (minutes) | 15 | 30 | 60 | 90 | 120 | 240 |
|---|---|---|---|---|---|---|
| Tensile strength (kg/cm$^2$) | 140 | 199 | 275 | 207 | 196 | 220 |
| Elongation at break (%) | 340 | 340 | 320 | 270 | 260 | 300 |
| Modulus at 200% (kg/cm$^2$) | 66 | 120 | 132 | 140 | 142 | 133 |
| Modulus at 300% (kg/cm$^2$) | 110 | 185 | 222 | — | — | 220 |
| Permanent set (%) | 12 | 8 | 8 | 10 | 6 | 6 |

Seventy parts by weight of the terpolymer admixed with 30 parts of Circosol 2XH are vulcanized at 150°C with the first mix described in Example 1, for different times. The mechanical characteristics of the vulcanizate are shown in the following table:

| Time (minutes) | 15 | 30 | 60 | 90 | 120 | 240 |
|---|---|---|---|---|---|---|
| Tensile strength (kg/cm$^2$) | 125 | 159 | 168 | 170 | 173 | 160 |
| Elongation at break (%) | 580 | 500 | 480 | 420 | 400 | 400 |
| Modulus at 200% (kg/cm$^2$) | 22 | 40 | 43 | 55 | 61 | 56 |
| Modulus at 300% (kg/cm$^2$) | 46 | 77 | 82 | 106 | 118 | 116 |
| Permanent set (%) | 28 | 24 | 20 | 16 | 8 | 10 |

EXAMPLE 24

Into the reaction apparatus as described in Example 3, kept at the constant temperature of −20°C, 350 cc of anhydrous n-heptane and 1.25 cc of radioactive 1,4,9-decatriene are introduced. Through the gas inlet tube a propylene-ethylene stream having molar ratio 2:1 is injected and circulated at a rate of 450 Nl/h.

The catalyst is preformed in a 100 cc flask by operating at −20°C under nitrogen and reacting 2.5 millimoles of aluminum diethylmonochloride, with 0.5 millimoles of VCl$_4$. The catalyst thus preformed is siphoned into the reactor, by means of nitrogen pressure. The ethylene-propylene mixture is continuously fed and discharged at a rate of 450 Nl/h. 3 minutes after introduction of the catalyst the reaction is stopped by the addition of 10 cc methanol containing 0.1 g of phenyl-betanaphthylamine. The product is purified and isolated as described in Example 1.

After vacuum drying there are obtained 8 gms of solid terpolymer which is atmorphous when examined under the X-rays, looks like an unvulcanized elastomer, and is completely soluble in boiling n-heptane.

Radiochemical analysis shows that this terpolymer has a content of the n-decatriene equal to 2.8% by weight.

100 parts by weight of the terpolymer are vulcanized with the first mix and according to the same procedure as described in Example 1. A vulcanized sheet is obtained, which has the following characteristics:

| | |
|---|---|
| tensile strength | 191 kg/cm$^2$ |
| elongation at break | 260% |
| modulus at 200% | 129 kg/cm$^2$ |
| permanent set | 6% |

EXAMPLES 25–26

The same conditions as in Example 24 are adopted, using decreasing amounts of the radioactive 1, 4, 9-decatriene.

The following table gives the decatriene content of the terpolymer radiochemically determined, and the mechanical properties of the vulcanizates, obtained under vulcanization conditions similar to those described in Example 21.

TABLE 1

Terpolymerization runs using ethylene, propylene and decreasing amounts of n-decatriene, the ethylene-propylene mixtures being the same as in Examples 16–17.

| | Vulcanizing conditions | | | Product | | Properties of the vulcanizates | | | | |
|---|---|---|---|---|---|---|---|---|---|---|
| Ex | 1,4,9-decatreine (cc) | Time (minutes) | g | 1,4,9 n-decatriene (% by wt.) | | Tensile strength (kg/cm$^2$) | Elong. at break (%) | Mod. at 200% (kg/cm$^2$) | Mod. at 300% (kg/cm$^2$) | Perm set (%) |
| 16 | 1 | 2.5 | 11.5 | 2.55 | | 174 | 580 | 39 | 73 | 20 |
| 17 | 0.75 | 2 | 6.9 | 1.8 | | 127 | 520 | 33 | 60 | 30 |

EXAMPLE 27

The reaction apparatus consists of a glass cylinder of 5.5 cm diameter and 700 cc capacity, and provided with a stirrer and gas inlet and outlet tubes. The gas inlet tube extends to the bottom of the apparatus and terminates in a porous plate (3.5 cm diameter).

Into the reactor, kept at the constant temperature of −20°C, there are introduced 200 cc anhydrous n-heptane and 3 cc n-decatriene -1,5,9. From the gas inlet tube a propylene-ethylene mixture having a molar ratio of 3:1 is injected and circulated at a rate of 400 Nl/h.

The catalyst is preformed in a 100 cc flask by reacting, at −20°C and under nitrogen, 0.5 millimoles vanadyl trichloride and 2.5 millimols aluminum diethylmonochloride in 25 cc anhydrous n-heptane. The catalyst thus prepared is siphoned into the reactor by means of nitrogen pressure. The ethylene-propylene mixture is continuously fed and discharged at a rate of 400 Nl/h.

18 minutes after addition of the catalyst, the reaction is stopped by adding 10 cc methanol 0.1 g phenyl-beta-napthylamine. The product is purified by repeated treatments with dilute hydrochloric acid and then with water and coagulated in acetone.

After vacuum drying, there are obtained 4.3 g of a solid terpolymerizate which is amorphous at the X-rays, has the aspect of an unvulcanized elastomer, and is completely soluble in boiling n-heptane.

Analysis of this terpolymerizate by infrared spectrography shows the presence of vinyl groups (bands at 10 and 11 microns) and trans double bonds (band at 10.35 micron). The molar ratio ethylene-propylene is about equal to 1.

100 parts by weight of the terpolymerizate are mixed on a laboratory roll mixer with 50 parts of HAF carbon black, 5 parts of zinc oxide, 1.5 parts of sulphur, 1.5 parts of tetramethylthiuram-monosulphide and 0.5 parts of mercaptobenzothiazole.

The mixture is vulcanized in a press at 150°C for 60 minutes. A vulcanized sheet having the following characteristics is obtained:

| tensile strength | 246 kg/cm$^2$ |
| elongation at break | 440 % |
| modulus at 200% | 69 kg/cm$^2$ |
| modulus at 300% | 152 kg/cm$^2$ |
| permanent set | 10 % |

EXAMPLE 28

Into reaction apparatus as described in Example 1, kept at the constant temperature of −20°C, 200 cc anhydrous n-heptane and 3 cc n-decatriene -1,5,9 are introduced. From the gas inlet tube a propyleneethylene mixture having molar ratio 2:1 is sent in and circulated at a rate of 300 Nl/h. The catalyst is preformed, in the 100 cc flask, by operating at −20°C under nitrogen and reacting 0.5 millimoles vanadium tetrachloride and 2.5 millimols aluminum diethylmonochloride in 25 cc anhydrous n-heptane.

The catalyst thus prepared is siphoned into the reactor by means of nitrogen pressure. The ethylene-propylene mixture is continuously fed and discharged at a rate of 300 Nl/h.

4 minutes after introduction of the catalyst, the reaction is stopped by adding 10 cc methanol containing 0.1 g phenylbetanaphthylamine. The product is purified and isolated as described in Example 1.

After vacuum drying, there are obtained 8.2 g of a solid terpolymerizate which is amorphous when subjected to X-rays examination, has the aspect of an unvulcanized elastomer, and is completely soluble in boiling n-heptane.

Analysis of this terpolymerizate by infrared spectrography shows the presence of vinyl groups (bands at 10 and 11 microns) and of trans double bonds (band at 10.35 microns). The molar ratio ethylene-propylene is approximately 1.

The terpolymerizate is vulcanized with a mix and according to the same procedures as described in Example 1. A vulcanized sheet having the following characteristics is obtained:

| tensile strength | 200 kg/cm$^2$ |
| elongation at break | 400 % |
| modulus at 200 % | 69 kg/cm$^2$ |
| modulus at 300 % | 142 kg/cm$^2$ |
| permanent set | 10 % |

EXAMPLE 29

Into reactor as described in Example 1, kept at the constant temperature of −20°C, 200 cc anhydrous n-heptane and 5 cc n-decatriene-1,5,9, are introduced. From the gas inlet tube a propylene/ethylene mixture having molar ratio 4:1 is injected and circulated at a rate of 250 Nl/h.

The catalyst is preformed in a 100 cc flask by operating at −20°C under nitrogen and reacting 1.4 millimoles vanadium triacetylacetonate and 7 millimoles aluminum diethylmonochloride in 30 cc anhydrous toluene.

The catalyst thus preformed is kept at −20°C for 5 minutes and then siphoned into the reactor by means of nitrogen pressure.

11 minutes after introduction of the catalyst the reaction is stopped by addition of 10 cc methanol containing 0.1 g phenylbetanaphthylamine. The product is purified and isolated as described in Example 1. After vacuum drying, there are obtained 12.1 g of a solid terpolymerizate which is amorphous at the X-rays, looks like an unvulcanized elastomer, and is completely soluble in boiling n-heptane.

Analysis of this terpolymerizate by infrared spectrography shows the presence of vinyl groups (bands at 10 and 11 microns) and of trans double bonds (band at 10.35 microns). The molar ratio ethylene-propylene is about 1.

The terpolymer is vulcanized with the same mix and same procedure as in Example 1. A vulcanized sheet having the following characteristics is obtained:

| tensile strength | 170 kg/cm$^2$ |
| elongation at break | 440 % |
| modulus at 200% | 61 kg/cm$^2$ |
| modulus at 300% | 115 kg/cm$^2$ |
| permanent set | 12% |

As will be apparent, various changes and modifications can be made in practicing the invention without departing from the spirit thereof. Therefore, we intend to include in the scope of the appended claims all such variations in detail as will be obvious to those skilled in the art from the description and illustrative working examples given herein.

What is claimed is:

1. Substantially linear, amorphous, unsaturated high molecular weight copolymers of at least one monoolefin having the formula $CH_2 = CHR$ in which R is selected from the group consisting of hydrogen and alkyl groups containing from 1 to 6 carbon atoms, and at least one triene selected from the group consisting of 1,4,9-decatriene; alkyl-substituted 1,4,9- decatriene, aryl-substituted 1,4,9-dectriene; arylalkyl-substituted 1,4,9-decatriene; and 1,5,9-decatriene, said copolymers containing ethylene in an amount less than about 75% by mols and such that the copolymer is amorphous on X-ray examination, between 0.1% and 30% by mols of the triene, and the balance, if any, being a higher alpha-olefin of the formula $CH_2 = CHR$ in which R is an alkyl group containing from 1 to 6 carbon atoms, and consisting of macromolecules containing unsaturations and each of which is made up of units derived from all of the starting monomers, and said copolymers being further characterized in that each of the units derived from the triene contains at least one free double bond.

2. Copolymers according to claim 1, in which the units containing at least one free double bond are derived from 1,4,9-decatriene.

3. Copolymers according to claim 1, in which the units containing at least one free double bond are derived from 1-phenyl-decatriene-1,4,9.

4. Copolymers of ethylene and 1,4,9-decatriene, according to claim 1.

5. Copolymers according to claim 1, consisting of macromolecules each of which is made up of units derived from ethylene and units derived from 1,4,9-decatriene.

6. Copolymers according to claim 1, in -decatriene, the units containing at least one free double bond are derived from 1,5,9-decatriene.

7. Copolymers of ethylene and 1,5,9-decartriene, according to claim 1.

8. Copolymers according to claim 1, consisting of macromolecules each of which is made up of units derived from ethylene and units derived from 1,5,9-decatriene.

9. Copolymers according to claim 1, consisting of macromolecules each of which is made up of units derived from ethylene and units derived from 1-phenyl-decatriene-1,4,9.

10. Copolymers according to claim 1, consisting of macromolecules each of which is made up of units derived from ethylene, units derived from propylene, and units derived from 1,4,9-decatriene.

11. Copolymers according to claim 1, consisting of macromolecules each of which is made up of units derived from ethylene, units derived from propylene, and units derived from 1-phenyl-decatriene-1,4,9.

12. Copolymers according to claim 1, consisting of macromolecules each of which is made up of units derived from ethylene, units derived from butene-1, and units derived from 1,4,9-decatriene.

13. Copolymers according to claim 1, consisting of macromolecules each of which is made up of units derived from ethylene, units derived from butene-1, and units derived from 1-phenyl-decatriene-1,4,9.

14. Copolymers according to claim 1, consisting of macronomolecules each of which is made up of units derived from ethylene, units derived from propylene, and units derived from 1,5,9-decatriene.

15. Copolymers according to claim 1, consisting of macromolecules each of which is made up of units derived from ethylene, units derived from butene-1, and units derived from 1,5,9-decatriene.

16. A process for preparing substantially linear, amorphous, unsaturated, high molecular weight copolymers of at least one monoolefin having the formula $CH_2 = III\ CHR$ in which R is selected from the group consisting of hydrogen and alkyl groups containing from 1 to 6 carbon atoms, and at least one triene selected from the group consisting of 1,4,9-decatriene, alkylsubstituted 1,4,9-decatriene, aryl-substituted 1,4,9-decatriene, arylalkylsubstituted 1,4,9-decatriene, and 1,5,9-decatriene, consisting of macromolecules containing unsaturations and each of which is made up of units derived from each of the starting monomers and which copolymers are further characterized in that each of the units derived from the triene contain at least one free double bond, which process comprises contacting a mixture of the monomers at a temperature of from −80°C to 125°C with a catalyst consisting essentially of the product obtained by mixing (1) a compound selected from the group consisting of organometallic compounds of metals belonging to Groups I to II inclusive of the Mendeleeff Periodic Table, complex organometallic compounds of said metals, hydrides of said metals, and complex hydrides of metals belonging to Groups I and III of said Table and (2) compounds of transition metals belonging to Groups IV and V of said Table and selected from the group consisting of titanium, vanadium, niobium and tantalum.

17. The process according to claim 16, characterized in that at least one of the catalyst-forming components (1) and (2) contain at least one halogen atom.

18. The process according to claim 16, further characterized in that catalyst-forming component (2) is a hydrocarbon-soluble vanadium compound selected from the group consisting of vanadium halides, vanadium oxyhalides, and vanadium compounds in which at least one of the metal valences is satisfied by a heteroatom linked to an organic group.

19. The process according to claim 16, further characterized in that catalyst-forming component (2) is a hydrocarbon-insoluble vanadium compound selected from the group consisting of vanadium triacetate, vanadium tribenzoate and vanadium tristearate.

20. The process according to claim 16, further characterized in that catalyst-forming component (1) is selected from the group consisting of lithium alkyls, lithium hydride, lithium-aluminum tetraalkyls, lithiumaluminum alkylhydrides, lithium-aluminum hydride, beryllium dialkyls, beryllium alkylhalides, beryllium diaryls, zinc dialkyls, zinc alkylhalides, zinc hydride, calcium hydride, cadmium dialkyls, cadium diaryls, aluminum trialkyls, aluminum dialkyl monohalides, aluminum monoalkyldihalides, aluminum alkenyls, aluminum alkylenes, aluminum cycloalkyls, aluminum cycloalkylalkyls, aluminum aryls, aluminum alkylaryls, aluminum alkylhydrides, aluminum halogen hydrides, aluminum dialkylalkoxides, aluminum alkylalkoxyhalides, and complexes of said aluminum compounds with a Lewis base.

21. The process according to claim 20, further characterized in that catalyst-forming component (2) is a hydrocarbon-soluble halogen-containing vanadium compound.

22. The process according to claim 20, further characterized in that the catalyst-forming component (2) is a halogen-free vanadium compound.

23. The process according to claim 16, further characterized in that the catalyst is prepared from (1) an alkyl aluminum halide and (2) a vanadium compound selected from the group consisting of vandium triacetyllacetonate, vanadyl trialcoholates and vanadyl haloalcoholates, and the mixed monomers are copolymerized with said catalyst at a temperature of from 0° to 125°C, in the presence of from 0.05 mole to 1.0 mole per mole of the alkyl aluminum halide of a comple ng agent selected from the group consisting of ethers nd thioethers having the general formula RYR'', wh ein Y represents an atom selected from the group c isisting of oxygen and sulfur atoms and R and R' ea h designate a radical selected from the group consisting of linear and branched alkyl radicals containing from 1 to 14 carbon atoms and aromatic nuclei containing from 6 to 14 carbon atoms, at least one of R and R' being selected from the group consisting of branched alkyl radicals and aromatic nuclei; tertiary amines having the general formula

wherein R, R' and R'' each represent a radical selected from the group consisting of alkyl radicals containing from 1 to 14 carbon atoms and aromatic nuclei containing from 6 to 14 carbon atoms, at least one of R, R' and R'' representing an aromatic nuclei; and trisubstituted phosphines having the general formula

wherein R, R' and R'' each represent a radical selected from the group consisting of alkyl radicals containing from 1 to 14 carbon atoms and aromatic nuclei containing from 6 to 14 carbon atoms, at least one of R, R' and R'' representing an aromatic nucleus.

24. The process according to claim 16, further characterized in that the monomers are maintained in the liquid state and copolymerized in the absence of an inert extraneous copolymerization solvent.

* * * * *

UNITED STATES PATENT AND TRADEMARK OFFICE
CERTIFICATE OF CORRECTION

PATENT NO. : 3,900,452
DATED : August 19, 1975
INVENTOR(S) : Alberto VALVASSORI et al It is certified that error appears in the above-identified patent and that said Letters Patent are hereby corrected as shown below:

Col. 10, line 33, "360 Nl/h." should be - - - 300 Nl/h. - - -

Col. 16, line 13, "450 Nl/h.450" should be - - -

450 Nl/h. - - -;

line 62 "(band at 6.225 micron)" should be - - -

(band at 6.25 micron - - -

Col. 17, line 11, "200 cc" should be - - - 2000 cc - - -.

Col. 18, line 23, "$-20^{oo}C$" should be - - - $20^{o}C$ - - -;

line 36, after "of" the word - - - phenylbetanaphthylamine. - - - is missing,

Col. 19, line 12, after "of" the word - - - phenylbetanaphthylamine. - - - is missing, Col. 25, Claim 16,
line 41, "$CH_2$ = III CHR" the formula should be - - -

$CH_2$ = CHR - - -.

Claim 16,
line 57, "Groups I to II inclusive" should be - - -

Groups I to III inclusive - - -.

Signed and Sealed this fourth Day of May 1976

[SEAL]

Attest:

RUTH C. MASON
Attesting Officer

C. MARSHALL DANN
Commissioner of Patents and Trademarks